(12) United States Patent
Lee

(10) Patent No.: US 11,068,179 B2
(45) Date of Patent: Jul. 20, 2021

(54) SMART VEHICLE SYSTEM WITH DATA PROCESSING APPARATUS

(71) Applicant: SK hynix Inc., Icheon-si (KR)

(72) Inventor: Hyeng Ouk Lee, Yongin-si (KR)

(73) Assignee: SK HYNIX INC., Icheon-si (KR)

( * ) Notice: Subject to any disclaimer, the term of this patent is extended or adjusted under 35 U.S.C. 154(b) by 85 days.

(21) Appl. No.: 16/358,628

(22) Filed: Mar. 19, 2019

(65) Prior Publication Data

US 2020/0192587 A1 Jun. 18, 2020

(30) Foreign Application Priority Data

Dec. 18, 2018 (KR) .................. 10-2018-0164376

(51) Int. Cl.
- *G06F 3/06* (2006.01)
- *G07C 5/08* (2006.01)
- *G06F 13/16* (2006.01)

(52) U.S. Cl.
CPC .......... *G06F 3/0634* (2013.01); *G06F 3/0619* (2013.01); *G06F 3/0673* (2013.01); *G06F 13/1678* (2013.01); *G07C 5/085* (2013.01)

(58) Field of Classification Search
CPC .... G06F 3/0634; G06F 3/0619; G06F 3/0673; G06F 3/0614; G06F 3/0661; G06F 3/0611; G06F 3/0613; G06F 3/0671; G06F 13/1678; G06F 13/1684; G06F 13/1694; G06F 13/1668; G07C 5/085
See application file for complete search history.

(56) References Cited

U.S. PATENT DOCUMENTS

| | | | | |
|---|---|---|---|---|
| 5,721,860 A | * | 2/1998 | Stolt | G06F 13/1694 365/230.01 |
| 5,917,838 A | * | 6/1999 | Wardrop | G06F 11/1044 714/746 |
| 6,178,517 B1 | * | 1/2001 | Bertin | G06F 13/1684 713/324 |
| 6,292,874 B1 | | 9/2001 | Barnett | |
| 6,968,419 B1 | * | 11/2005 | Holman | G06F 13/1694 711/5 |
| 7,170,815 B2 | | 1/2007 | Kang | |
| 2002/0029365 A1 | * | 3/2002 | Sato | G06F 11/10 714/763 |
| 2004/0133758 A1 | * | 7/2004 | Matsuda | G06F 13/1694 711/167 |
| 2007/0234142 A1 | * | 10/2007 | Aizawa | G06F 11/1068 714/718 |

(Continued)

*Primary Examiner* — Michael Krofcheck

(57) ABSTRACT

A smart vehicle system is disclosed, which relates to technology for increasing efficiency of a vehicle-embedded memory. The smart vehicle system includes a host and a storage device. The host selects any one of a first mode and a second mode according to operation, process or workload of a vehicle, and transmits and receives data through different channels in response to the first mode and the second mode. The storage device stores the data received through different channels in the first core circuit and the second core circuit, or reads the data stored in the first core circuit and the second core circuit. The storage device executes different operations in the first mode and the second mode in a manner that an operation to be executed in the first mode is different from an operation to be executed in the second mode.

20 Claims, 6 Drawing Sheets

(56) References Cited

U.S. PATENT DOCUMENTS

| | | | |
|---|---|---|---|
| 2009/0063787 A1* | 3/2009 | Gower | G06F 13/1668 |
| | | | 711/149 |
| 2010/0110190 A1* | 5/2010 | Her | G07C 5/0891 |
| | | | 348/148 |
| 2012/0151166 A1* | 6/2012 | Suto | G06F 3/064 |
| | | | 711/162 |
| 2013/0141973 A1* | 6/2013 | Kim | G11C 16/349 |
| | | | 365/185.03 |
| 2014/0089726 A1* | 3/2014 | Warnes | G06F 11/1008 |
| | | | 714/6.1 |

* cited by examiner

SMART VEHICLE SYSTEM WITH DATA PROCESSING APPARATUS

CROSS-REFERENCE TO RELATED APPLICATION

This application claims priority to Korean patent application No. 10-2018-0164376, filed on Dec. 18, 2018, the disclosure of which is hereby incorporated by reference in its entirety as if fully set forth herein.

BACKGROUND OF THE INVENTION

1. Technical Field

Embodiments of the present disclosure generally relate to a smart vehicle and methods of operating a smart vehicle and a smart vehicle system, and more particularly to a smart vehicle system with technology for increasing efficiency of a vehicle-embedded memory, which in turn results in improvements in vehicle operation.

2. Related Art

Recently, as various mobile communication devices, such as smartphones, tablets, etc. for example, have been widely used throughout the world, the demand for information technology (IT) convergence and for the unification of digital information across devices and platforms has increased. For example, demand for infotainment, telematics, etc. within vehicles is rapidly increasing. Therefore, many developers and companies have focused attention on smart vehicle technology for providing drivers and passengers with higher safety, reliability and comfort through the use of information communication technology available to vehicle industries.

As a non-limiting example of a vehicle, a smart vehicle may refer to a car, truck or automobile to which various Information and Communication Technologies (ICT) are applied and/or installed. The smart vehicle may combine or collect various kinds of in-vehicle information, may manage the unified in-vehicle information, and may provide drivers and passengers with various content and data, for example, entertainment-related content, information content, convenience-related content, etc.

The smart vehicle has been developed by combining traditional mechanical-based vehicle technology with modern technologies, for example, next-generation electrical and electronics technologies, information communication technologies, intelligence control technologies, artificial intelligence technologies, etc. Therefore, the smart vehicle is able to collect, in real time, information about a peripheral region of a vehicle, including any devices external to the vehicle, as well as information about in-vehicle devices, so that such information can increase operational reliability and stability of the smart vehicle. In addition, the smart vehicle includes various convenience-related functions and operations that can be augmented with the information, resulting in an increase in user satisfaction or comfort.

The smart car, or any other vehicle, may store in-vehicle information in a storage device such as a memory, and may control the vehicle operation in response to or using information stored in the storage device. For example, the smart vehicle may store data having high-bandwidth characteristics in the storage device. The smart vehicle may also need to store data having high-reliability characteristics in the storage device because the smart vehicle may need these data with different characteristics according to the operation or workload of the vehicle. For example, the workload is a quantified size of a load processed by a processor by measuring a transaction response time, an input/output service rate, a CPU use time, data transmission/operation and the like. Namely, an operating system quantifies a plurality of tasks by a plurality of workload units in accordance with a preset reference, and a processor is then able to process a plurality of the tasks all by processing a plurality of the quantified workloads.

It is impossible for only one storage device to support not only data having high-bandwidth characteristics, but also other data having high-reliability characteristics, such that the smart vehicle must include a plurality of storage devices according to the different characteristics of data. As a result, a system region of the smart vehicle may unavoidably increase in size, resulting in reduction in system throughput or performance.

BRIEF SUMMARY OF THE INVENTION

Various embodiments of the present disclosure are directed to providing a smart vehicle system in a vehicle that substantially obviates one or more problems due to limitations and disadvantages of the related art, as well as to methods of operating the vehicle and the smart vehicle system.

The embodiments of the present disclosure relate to a smart vehicle with a smart vehicle system that utilizes a single memory to support vehicle operations that, depending on the workload or the nature of the operations, require data having different characteristics, resulting in an increase in memory efficiency, as well as to methods of operation. Although embodiments herein are described with respect to a smart vehicle, it will be understood that the scope of the present disclosure in not limited thereto, and includes other smart vehicles known to those having ordinary skill in the art.

In accordance with an embodiment of the present disclosure, a smart vehicle system includes a host configured to select any one of a first mode and a second mode according to operation of a vehicle, and to transmit and receive data through a first channel or a second channel in response to selection of the first mode or the second mode, and a storage device configured to store a data received through the first channel in a first core circuit and to store a data received through the second channel in a second core circuit, or to read the data stored in the first core circuit and the second core circuit, and to transmit the data to the host through the first channel or the second channel. The storage device may execute different operations in the first mode and the second mode.

In accordance with another embodiment of the present disclosure, a smart car system includes a memory device configured to include a first core circuit storing first data received through a first channel and a second core circuit storing second data received through a second channel, and a storage controller configured to generate a clock signal, an error detection signal, a command, and an address that are needed to control operations of the memory device, and generate an interface control signal and a data control signal. The memory device stores or reads the first data in the first core circuit in a first operation mode, and stores or reads the second data in the second core circuit in a second operation mode.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other features and advantages of the present disclosure will become readily apparent by reference to the following detailed description when considered in conjunction with the accompanying drawings wherein.

DESCRIPTION OF EMBODIMENTS

Reference will now be made in detail to embodiments of the present disclosure, examples of which are illustrated in the accompanying drawings. Wherever possible, the same reference numbers are used throughout the drawings to refer to the same or like portions. Throughout the specification of the present disclosure, if it is assumed that a certain part is connected (or coupled) to another part, then the term "connection or coupling" means that the certain part is directly connected (or coupled) to another part and/or is electrically connected (or coupled) to another part through another medium. Throughout the specification of the present disclosure, if it is assumed that a certain part includes a certain component, then the term "comprising", "having" or "including" means that a corresponding component may further include other components unless a specific meaning opposed to the corresponding component is written. As used in the specification and appended claims, the terms "a", "an", "one", "the" and other similar terms include both singular and plural forms, unless context clearly dictates otherwise. The terms used in the present application are merely used to describe specific embodiments and are not intended to limit the present disclosure. A singular expression may include a plural expression unless otherwise stated in the context.

Figure 1:
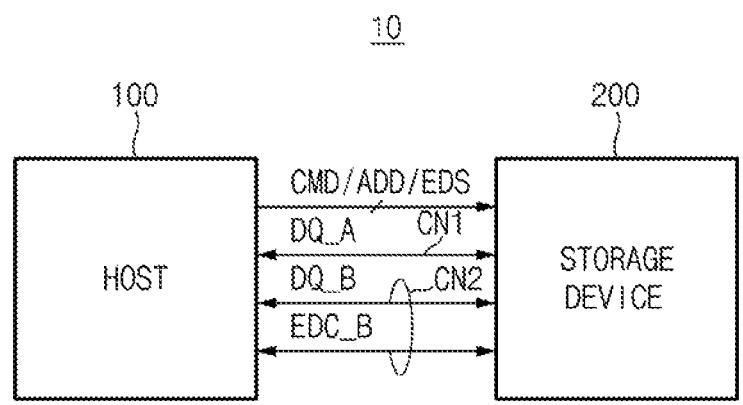
FIG. 1 is a block diagram illustrating a representation of an example of a smart vehicle system according to an embodiment of the present disclosure.

FIG. 1 is a block diagram illustrating a representation of an example of a smart vehicle system 10 according to an embodiment of the present disclosure.

Referring to FIG. 1, a smart vehicle includes a smart car system 10, which may include a host 100 and a storage device 200.

The host 100 may generate a control signal needed or used to store data in the storage device 200. The host 100 may receive information from the storage device 200. The host 100 may include a connection channel utilized to transmit and receive information to and from the storage device 200. Non-limiting examples of a connection channel are, for instance, a bus, a socket, a slot, a connector, or the like. The connection channel may have a plurality of channels such as CN1 and CN2, for example. The host 100 may transmit a command CMD, an address ADD, and an error detection signal EDS to the storage device 200 through such a connection channel. The host 100 and the storage device 200 may communicate with each other through the connection channel, such that data DQ_A and DQ_B and error detection data EDC_B may be communicated between the host 100 and the storage device 200 through the connection channel. The connection channel may be constructed in various ways according to known interface methods between the host 100 and the storage device 200.

In order to execute different modes of operations, the host 100 may discriminate or distinguish between data DQ_A and data DQ_B according to modes associated with the data. The host 100 may interface data DQ_A with the storage device 200 through a first channel CN1, and may interface data DQ_B with the storage device 200 through a second channel CN2.

For example, in a first mode, the host 100 may select the first channel CN1, and may transmit and receive data DQ_A to and from the storage device 200 through the selected first channel CN1. In a second mode, the host 100 may select the second channel CN2, and may transmit and receive data DQ_B to and from the storage device 200 through the selected second channel CN2.

The storage device 200 may perform a first mode operation in response to not only a command CMD and an address ADD, but also data DQ_A received through the first channel CN1. The storage device 200 may perform a second mode operation in response to not only a command and an address ADD, but also data DQ_B received through the second channel CN2.

In accordance with an embodiment, the storage device 200 may perform a second mode operation in response to not only a command CMD, an address ADD, and an error detection signal EDS, but also data DQ_B and error detection data EDC_B received through the second channel CN2. That is, when the error detection signal EDS is received form the host 100, the storage device 200 may transmit and receive the error detection data EDC_B, needed for error correction, to and from the host 100.

A first mode operation may be different in characteristics from a second mode operation with respect to bandwidth. In accordance with an embodiment, the first mode operation may refer to a high-speed operation in which data is transmitted at a high bandwidth (HBW). For example, during high-speed transmission of data, a bandwidth may be increased in size using a Double Data Rate (DDR), such that data can be input and output at high speed. The second mode operation may refer to a low-speed operation in which data is transmitted through a low bandwidth (LBW). For example, during low-speed transmission of data, a bandwidth may be reduced in size using a Single Data Rate (SDR), such that data can be input and output at low speed. Put another way, the first mode operation is not a low-speed operation in which data is transmitted at a LBW, and the second mode operation is not a high-speed operation in which data is transmitted at a HBW.

In accordance with another embodiment, the first mode operation may be different in characteristics from the second mode operation in terms of reliability. That is, the first mode operation may refer to an operation for transmitting data irrespective of reliability, or in a normal environment. In contrast, the second mode operation may refer to an operation for reducing the number of error bits to result in operations with high-reliability characteristics, such as data input/output (I/O) operations using the reduced error bits. Put another way, the second mode operation reduces the number of error bits in transmitting data, and the first mode operation does not refer to I/O operations using reduced error bits. In other words, when an operational mode requires input and output of data with a high degree reliability in the second mode, the error detection signal EDS is activated such that at least one error contained in the data is detected and corrected.

As described above, the smart vehicle with smart vehicle system according to embodiments of the present disclosure may discriminate or distinguish between data DQ_A dedicated to the first channel CN1 and data DQ_B dedicated to the second channel CN2 based on the mode of operation, such that the smart vehicle system may transmit data DQ_A through the first channel CN1 in the first mode, and may transmit data DQ_B through the second channel CN2 in the second mode. The smart vehicle system may allow different modes of operations that rely on at least two data DQ_A and DQ_B to be performed in only one storage device 200, resulting in an increase in memory efficiency. Of course, the number of modes of operation, and the number of associated data, are not limited to two.

Figure 2:
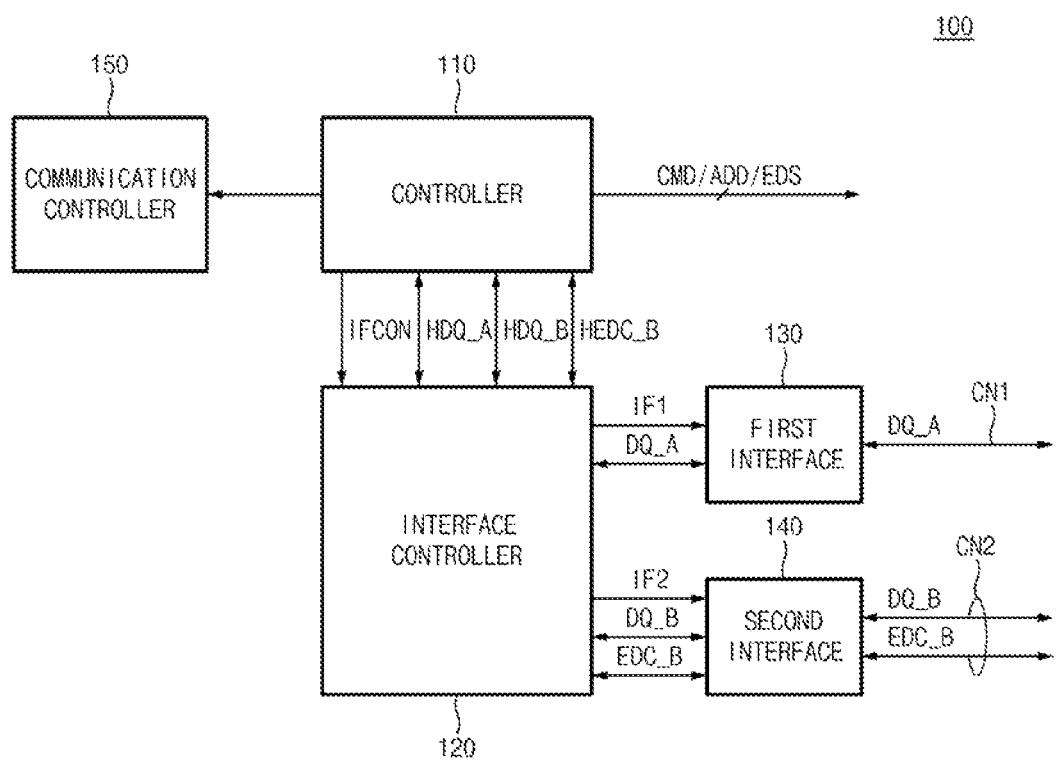
FIG. 2 is a block diagram illustrating a representation of an example of a host according to an embodiment of the present disclosure.

FIG. 2 is a block diagram illustrating the host 100 according to an embodiment of the present disclosure.

Referring to FIG. 2, the host 100 may include a controller 110, an interface controller 120, a first interface 130, a second interface 140, and a communication controller 150.

The controller 110 may control overall operations of the smart vehicle system 10. The controller 110 may generate a plurality of control signals to control operations of the storage device 200. The control signals generated by the controller 110 may include a command CMD, an address ADD, and an error detection signal EDS.

The controller 110 may transmit and receive data HDQ_A and HDQ_B, and error detection data HEDC_B, to and from the interface controller 120. The controller 110 may generate an interface control signal IFCON needed to select any one of channels CN1 and CN2 through which the controller 110 communicates with the storage device 200.

For example, the controller 110 may decide the work, workload, process or mode of operation of a vehicle, and may generate an interface control signal IFCON based on the desired vehicle workload, process or operation. Interface control signal IFCON can be used by the controller 110 to select the first channel CN1 dedicated to the first interface 130 or the second channel CN2 dedicated to the second interface 140. That is, the controller 110 may output the interface control signal IFCON for selecting any one of the first interface 130 and the second interface 140 according to workload of data transmission, workload information, process, operation, or mode of operation of vehicle, to the interface controller 120.

If a first mode operation is performed, the controller 110 may output the interface control signal IFCON at a first level (e.g., at a logic high level) to select the first channel CN1 through the first interface 130. In contrast, if the second mode operation is performed, the controller 110 may output the interface control signal IFCON at a second level (e.g., at a logic low level) to select the second channel CN2 through the second interface 140.

The interface controller 120 may receive data HDQ_A from the controller 110, and may transmit data DQ_A to the first interface 130. The interface controller 120 may receive data DQ_A from the first interface 130, and may transmit data HDQ_A to the controller 110. In this case, I/O data interfacing between the interface controller 120 and the controller 110 will hereinafter be referred to as "HDQ_A" for convenience of description, and other I/O data interfacing between the interface controller 120 and the first interface 130 will hereinafter be referred to as "DQ_A" for convenience of description.

The interface controller 120 may receive data HDQ_B and error detection data HEDC_B from the controller 110, and may transmit data DQ_B and error detection data EDC_B to the second interface 140. The interface controller 120 may receive data DQ_B and error detection data EDC_B from the second interface 140, and may thus transmit data HDQ_B and error detection data HEDC_B to the controller 110. In this case, I/O data interfacing between the interface controller 120 and the controller 110 will hereinafter be referred to as "HDQ_B" and "HEDC_B" for convenience of description, and other I/O data interfacing between the interface controller 120 and the second interface 140 will hereinafter be referred to as any of "DQ_B" and "EDC_B" for convenience of description.

The interface controller 120 may generate an interface selection signal IF1 to select the first interface 130. The interface controller 120 may generate an interface selection signal IF2 to select the second interface 140. For example, the interface selection signal IF1 may be activated after the interface control signal IFCON having a first level (e.g., a logic high level) is transmitted to the interface controller 120. The interface selection signal IF2 may be activated after the interface control signal IFCON having a second level (e.g., a logic low level) is transmitted to the interface controller 120.

Therefore, the interface controller 120 may select the first interface 130 or the second interface 140 in response to the interface control signal IFCON received from the controller 110.

When the first mode operation is performed, the interface controller 120 may activate the interface selection signal IF1 in response to the interface control signal IFCON received from the controller 110, such that the interface controller 120 may select the first interface 130. In contrast, when the second mode operation is performed, the interface controller 120 may activate the interface selection signal IF2 in response to the interface control signal IFCON received from the controller 110, such that the interface controller 120 may select the second interface 140.

In addition, the first interface 130 may transmit data DQ_A to the storage device 200 through the first channel CN1. The first interface 130 may receive data DQ_A from the storage device 200, and transmit the received data DQ_A to the interface controller 120.

The second interface 140 may transmit data DQ_B to the storage device 200 through the second channel CN2. In addition, the second interface 140 may receive data DQ_B from the storage device 200, and may transmit the received data DQ_B to the interface controller 120.

In accordance with an embodiment, when the interface selection signal IF2 is activated, the second interface 140 may transmit not only data DQ_B, but also error detection data EDC_B needed to detect data errors to the storage device 200. In addition, when the interface selection signal IF2 is activated, the second interface 140 may transmit error detection data EDC_B received from the storage device 200 to the controller 120. The first interface 130 and the second interface 140 may include various types of known interfaces connecting to the storage device 200.

The communication controller 150 may include a data exchange protocol, and may communicate with an external electronic device under control of the controller 110. For example, the communication controller 150 may communicate with the external electronic device using a wireless network, a telematics, Universal Plug and Play (UPnP), Controller Area Network (CAN) communication, Bluetooth, and Wi-Fi, as non-limiting examples.

For convenience of description and better understanding of the present disclosure, embodiments of the present disclosure have exemplarily disclosed only two interfaces, each of which interfaces with the storage device 200. However, types of such interfaces, number of interfaces, and communication schemes of interfaces according to embodiments of the present disclosure are not limited thereto.

In addition, embodiments of the present disclosure have exemplarily disclosed that only one of the first interface 130 and the second interface 140 is selected, for convenience of description and better understanding of the present disclosure. However, the scope or spirit of the present disclosure is not limited thereto, and two interfaces 130 and 140 may also be substantially simultaneously or simultaneously, or in overlapping operations, selected according to workload of data transmission, workload information, process, operation, or mode of operation of vehicle as necessary.

As described above, the host 100 may decide vehicle workload, operations or processes, such that the host 100 may determine which one of the first mode operation and the second mode operation is required based on the decided or selected operations or processes. In the first mode, the host 100 may interface with the storage device 200 through the first channel CN1. In the second mode, the host 100 may interface with the storage device 200 through the second channel CN2. That is, the host 100 may interface with the storage device 200 through different channels in different modes.

Figure 3:
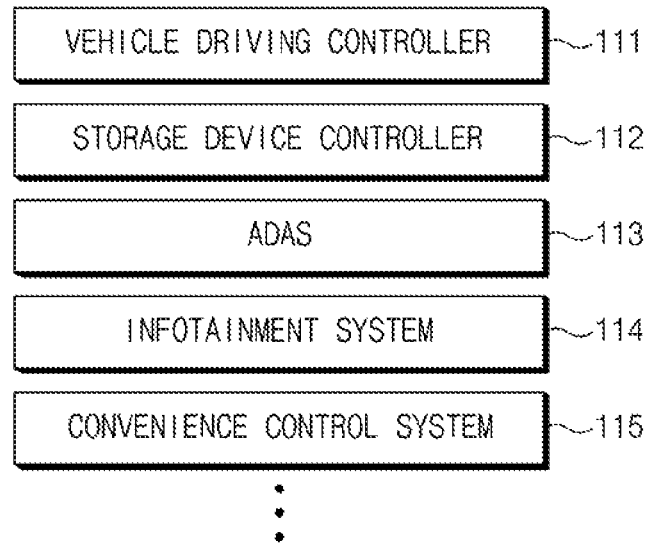
FIG. 3 is a block diagram illustrating a representation of an example of a controller shown in FIG. 2 according to an embodiment of the present disclosure.

FIG. 3 is a block diagram illustrating the controller 110 shown in FIG. 2 according to an embodiment of the present disclosure. As can be seen from FIG. 3, the controller 110 may be divided into a plurality of sub-controllers (i.e., a vehicle driving controller 111, a storage device controller 112, a driver assistance system (DAS) 113, an infotainment system 114, a convenience control system 115, etc.) according to individual application functions.

Referring to FIG. 3, the controller 110 may include a vehicle driving controller 111, a storage device controller 112, an advanced driver assistance system (ADAS) 113, an infotainment system 114, a convenience control system 115, etc.

The vehicle driving controller 111 may control overall operation of the smart vehicle system 10. Upon receiving a control command, the vehicle driving controller 111 may control background functional blocks according to firmware or software for driving the smart vehicle and smart vehicle system 10. The vehicle driving controller 111 may process operations of the smart vehicle system 10 in response to a control command, and may transmit a response signal to the processed result to the communication controller 150. The vehicle driving controller 111 may store data received from the storage device 200, or may read information stored in the storage device 200 and transmit the read information to an external device through the communication controller 150.

The storage device controller 112 may generate a control signal to control an operation of the storage device 200. That is, in order to execute different operation modes according to data transmission, workload, process, or operation of vehicle, the storage device controller 112 may select different channels CN1 and CN2 according to different operation modes, such that the storage device controller 112 may communicate with the storage device 200 through the selected channel in each respective operation mode.

The Advanced Driver Assistance System (ADAS) 113 may perform various functions using an advanced sensing device and an intelligent imaging device to support, for example, an adaptive headlights function, a forward collision avoidance (FCW) function, a lane departure warning (LDW) function, a blind spot monitoring (BSM) function, and an improved rear-view monitoring function, etc. In addition, the advanced driver assistance system (ADAS) 113 may perform a driver assistance function using map and location information acquired through sensors, an imaging device, or a navigation device, for example.

The term "infotainment" of the infotainment system 114 may refer to a compound word of information and entertainment, and the infotainment system 114 may transmit and receive amusement information to and from an external electronic device. In addition, the infotainment system 114 may include a phone function, a voice recognition function, a navigation function, etc., such that the infotainment system 114 may transmit and receive, in real time, necessary information to and from the external electronic device.

The convenience control system 115 may be a system for assisting driver or passenger convenience, may include a Power Trunk Module (PTM), a smart key system, and a Body Control Module (BCM), as non-limiting examples. The convenience control system 115 can provide a vehicle driver with driver-customized services using the above examples.

As described above, a wide variety of operations and processes of the vehicle, such as those relating to the above-described vehicle driving controller 111, the advanced driver assistance system (ADAS) 113, the infotainment system 114, and the convenience control system 115, are subject to control by the host 100. Therefore, depending on the required operation, process, function or mode, the controller 110 may determine the characteristics of data required from storage device 200. The controller 110 may require certain bandwidth-related or reliability-related characteristics of the data, which bears on the selection of the mode of operation, e.g., the first mode or the second mode.

Figure 4:
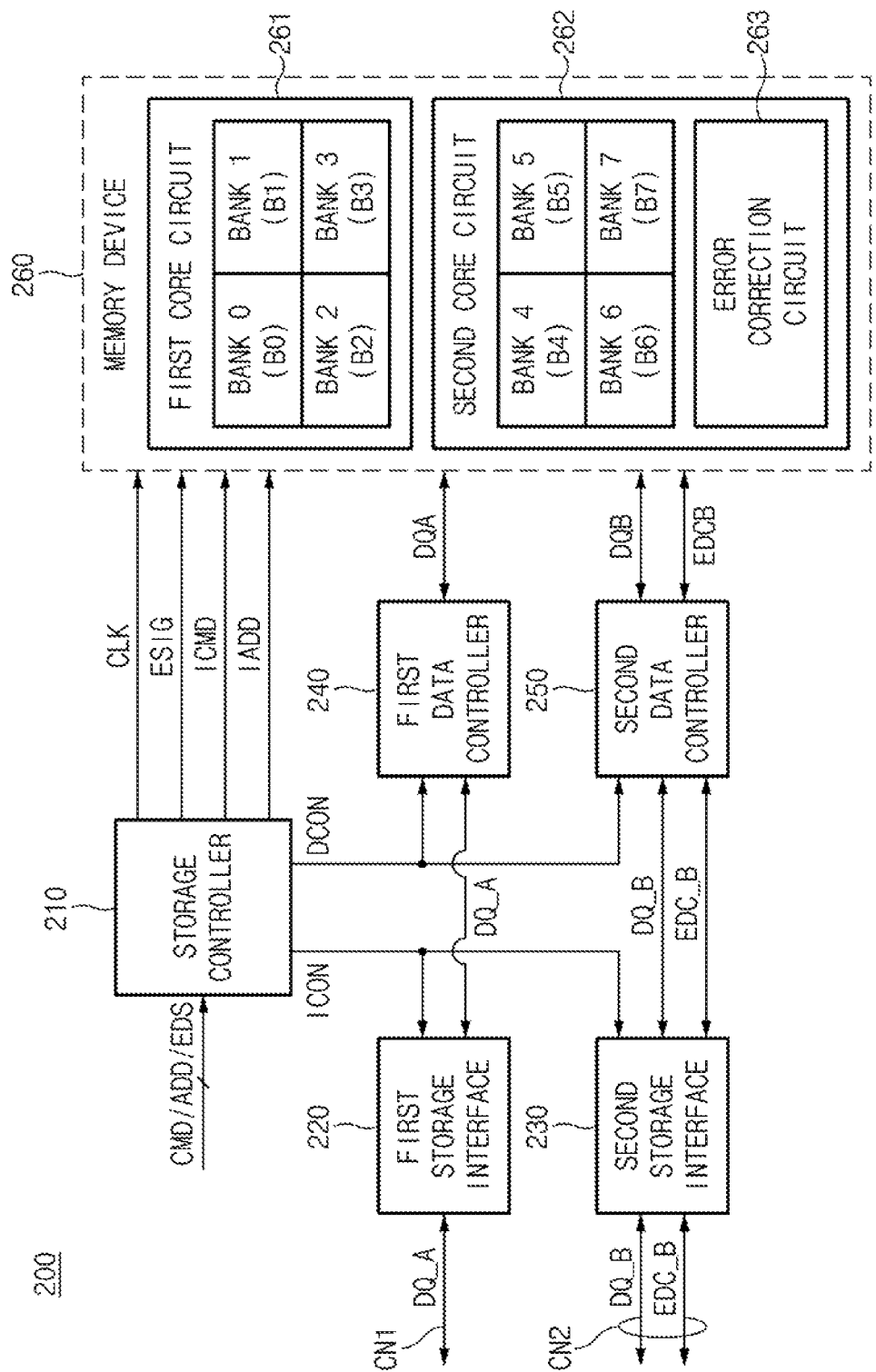
FIG. 4 is a block diagram illustrating a representation of an example of a storage device shown in FIG. 1 according to an embodiment of the present disclosure.

FIG. 4 is a block diagram illustrating the storage device 200 shown in FIG. 1 according to an embodiment of the present disclosure.

Referring to FIG. 4, the storage device 200 may include a storage controller 210, a first storage interface 220, a second storage interface 230, a first data controller 240, a second data controller 250, and a memory device 260.

The storage controller 210 may control overall operation of the storage device 200. The storage controller 210 may receive a command CMD, an address ADD, and an error detection signal EDS from the controller 110. The storage controller 210 may generate an interface control signal ICON to control an interfacing operation and a data control signal DCON to control data input/output (I/O) operations. In addition, the storage controller 210 may generate a clock signal CLK, an error detection signal ESIG, an internal command ICMD, and an internal address IADD which are needed to control operation of the memory device 260, and may output the clock signal CLK, the error detection signal ESIG, the internal command ICMD, and the internal address IADD to the memory device 260.

In a write operation of data, the first storage interface 220 may receive data DQ_A through a first channel CN1. The first storage interface 220 may transmit data DQ_A to the first data controller 240 in response to an interface control signal ICON. In a read operation of data, the first storage interface 220 may receive data DQ_A from the first data controller 240. The first storage interface 220 may transmit data DQ_A to the first interface 130 through the first channel CN1 in response to the interface control signal ICON.

In a different write operation, the second storage interface 230 may receive data DQ_B through a second channel CN2, and may transmit the received data DQ_B to the second data controller 250 in response to the interface control signal ICON. In a read operation of data, the second storage interface 230 may receive data DQ_B from the second data controller 250, and may transmit the received data DQ_B to the second interface 140 through the second channel CN2 in response to the interface control signal ICON.

In accordance with an embodiment, the second storage interface 230 may receive error detection data EDC_B through the second channel CN2 from second interface 140. The second storage interface 230 may transmit error detection data EDC_B to the second data controller 250 in response to the interface control signal ICON. The second storage interface 230 may transmit the error detection data EDC_B to the second interface 140 in response to the interface control signal ICON, and may receive error detection data EDC_B from the second data controller 250. In other words, when an error detection signal EDS is activated, the second storage interface 230 may transmit and receive error detection data EDC_B needed for error correction to and from the host 100.

The first data controller 240 may store data DQA in the memory device 260 or read the stored data DQA from the memory device 260 in response to a data control signal DCON. The second data controller 250 may store data DQB in the memory device 260 or read the stored data DQB from the memory device 260 in response to the data control signal DCON.

In other words, the first data controller 240 may receive data DQ_A from the first storage interface 220 in response to the data control signal DCON, and may thus transmit data DQA to the memory device 260. In addition, the first data controller 240 may receive data DQA from the memory device 260 in response to the data control signal DCON, and may thus transmit data DQ_A to the first storage interface 220.

The second data controller 250 may receive data DQ_B from the second storage interface 230 in response to the data control signal DCON, and may thus transmit data DQB to the memory device 260. The second data controller 250 may receive data DQB from the memory device 260 in response to the data control signal DCON, and may thus transmit data DQ_B to the second storage interface 230.

In accordance with an embodiment, the second data controller 250 may receive error detection data EDC_B from the second storage interface 230 in response to the data control signal DCON, and may thus transmit the resultant error detection data EDCB to the memory device 260. The second data controller 250 may receive error detection data EDCB from the memory device 260 in response to the data control signal DCON, and may thus transmit the resultant error detection data EDC_B to the second storage interface 230.

The memory device 260 may receive a clock signal CLK, an internal command ICMD, and an internal address IADD from the storage controller 210, such that the memory device 260 may store data DQA and DQB in at least one memory bank corresponding to the received information, or may read the data DQA and DQB stored in one or more memory banks. The memory device 260 may receive error detection data EDCB in response to an error detection signal ESIG, and may perform error detection and correction of data DQB using the received error detection data EDCB.

The memory device 260 may include a first core circuit 261, a second core circuit 262, and an error correction circuit 263. The first core circuit 261 and the second core circuit 262 may be included in a single chip. In this case, each of the first core circuit 261 and the second core circuit 262 may include one or more asynchronous parameters, and the first core circuit 261 and the second core circuit 262 may be accessed at different times. In some embodiments, the second core circuit 262 may include an error correction circuit 263.

In accordance with an embodiment, the first core circuit 261 and the second core circuit 262 may have the same core structure within a single chip, and may functionally sort or classify a plurality of bank regions (B0~B3, B4~B7) so as to process data that have different characteristics related to bandwidth or reliability. In accordance with another embodiment, the first core circuit 261 and the second core circuit 262 may have different core structures (different cell characteristics) within a single chip, and may physically sort or classify a plurality of bank regions (B0~B3, B4~B7) so as to process different characteristics of data.

The first core circuit 261 may include a plurality of banks B0~B3, and may store data DQA received from the first data controller 240 in any of the plurality of banks B0~B3. In this case, the plurality of banks B0~B3 may be defined as banks of a first group (hereinafter referred to as first-group banks). For example, when the storage device 200 operates in the first mode, the corresponding data DQA may be stored in any one of the banks B0~B3 of the first core circuit 261.

The second core circuit 262 may include a plurality of banks B4~B7, and may store data DQB received from the second data controller 250 in any of the plurality of banks B4~B7. In this case, the plurality of banks B4~B7 may be defined as banks of a second group (hereinafter referred to as second-group banks). For example, when the storage device 200 operates in the second mode, the corresponding data DQB may be stored in any one of the banks B4~B7 of the second core circuit 262. In some embodiments, an error correction operation is needed to increase the reliability of data DQB that is stored in or read from the memory device 260. Therefore, the error correction circuit 263 of the second core circuit 262 may receive error detection data EDCB, such that the error correction circuit 263 may perform error correction using the received error detection data EDCB.

The memory device 260 may be used as a storage medium of the smart vehicle system 10. The memory device 260 may store internal information of the smart vehicle system 10, and may transmit stored information to the host 100 upon receiving a request from the host 100. The memory device 260 may be implemented as a volatile memory, a non-volatile memory, or the like.

According to embodiments of the present disclosure, the memory device 260 may be implemented as a volatile memory, a non-volatile memory, or the like for convenience of description and better understanding of the present disclosure. However, the scope or spirit of the memory device 260 is not limited thereto.

For example, the memory device 260 according to other embodiments of the present disclosure may include various non-volatile memory devices, such as an Electrically Erasable and Programmable ROM (EEPROM), a NAND flash memory, a NOR flash memory, a Phase-Change RAM (PRAM), a Resistive RAM (ReRAM), a Ferroelectric RAM (FRAM), and a Spin Torque Transfer Magnetic RAM (STT-MRAM), as non-limiting examples.

The memory device 260 according to yet other embodiments of the present disclosure may be implemented as any one of various storage devices, such as a Solid State Drive (SSD), a Multi Media Card (MMC), an Embedded MMC (eMMC), a Reduced Size MMC (RS-MMC), a micro-MMC, a Secure Digital (SD) card, a mini Secure Digital (mini-SD) card, a micro Secure Digital (micro-SD) card, a Universal Serial Bus (USB) memory, a Universal Flash Storage (UFS) device, a Personal Computer Memory Card International Association (PCMCIA) card-type memory, a Peripheral Component Interconnection (PCI) card-type memory, a PCI-express (PCI-E) card-type memory, a Compact Flash (CF) card, a Smart Media (SM) card, and a memory stick, by way of non-limiting examples.

In addition, the memory device 260 according to still other embodiments of the present disclosure may be implemented as any one of various kinds of packages, such as a Package On Package (POP), a System In Package (SIP), a System On Chip (SOC), a Multi-Chip Package (MCP), a Chip On Board (COB), a wafer-level fabricated package (WFP), and a wafer-level stack package (WSP), as non-limiting examples.

Figure 5:
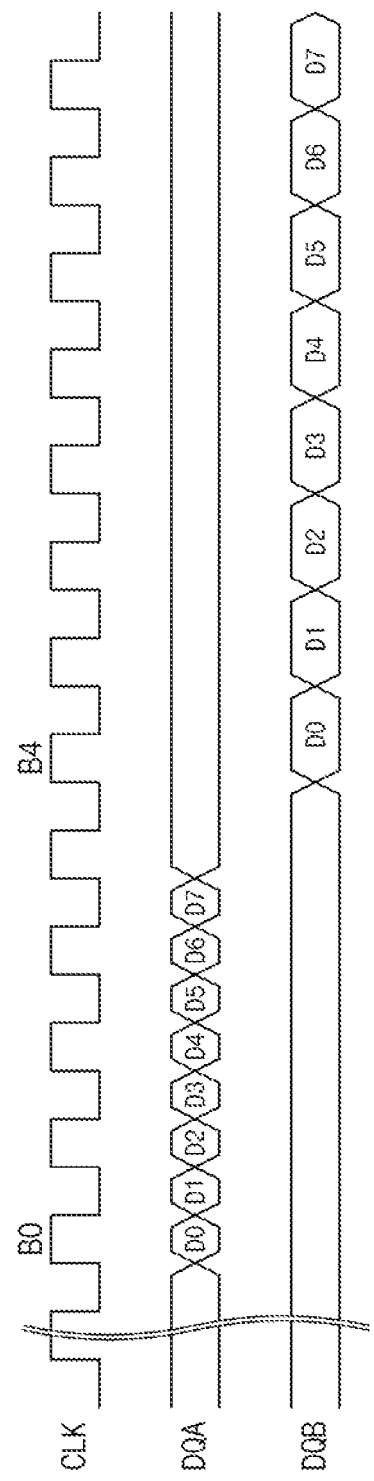
FIGS. 5 and 6 are timing diagrams illustrating methods of operation related to the storage device shown in FIG. 4 according to embodiments of the present disclosure.
Figure 6:
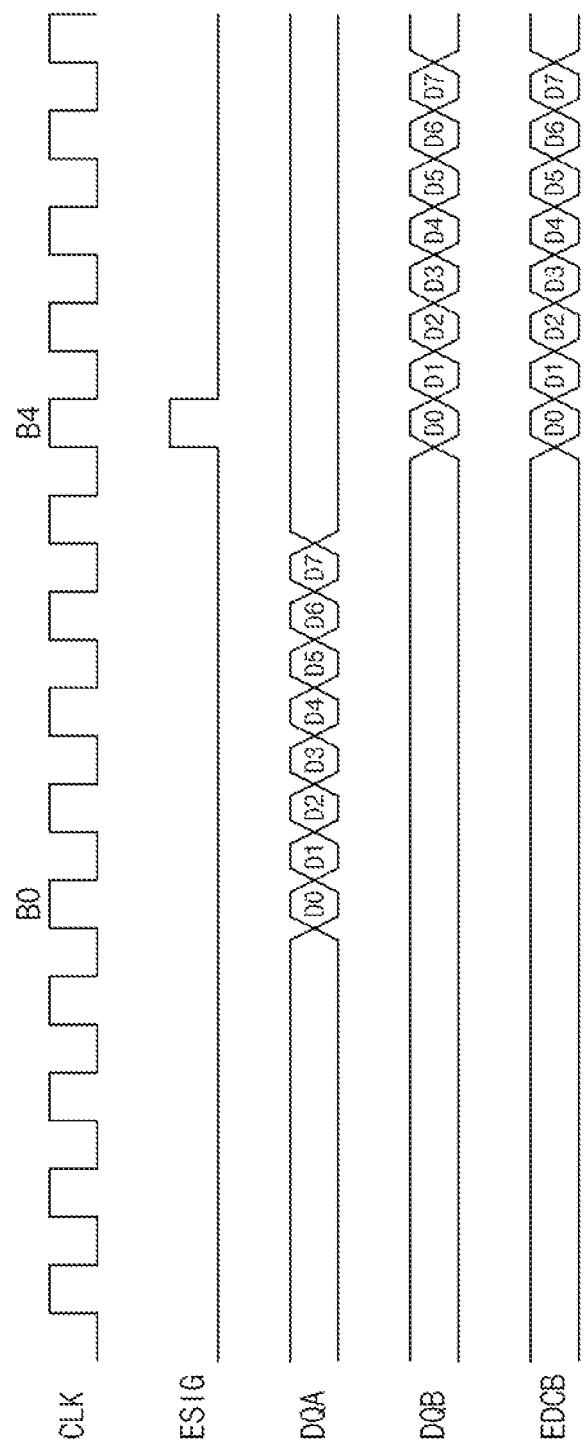

FIGS. 5 and 6 are timing diagrams illustrating methods of operating the storage device 200 shown in FIG. 4 according to embodiments of the present disclosure. Operations of the smart vehicle with a smart vehicle system according to the embodiments of the present disclosure will hereinafter be described with reference to FIGS. 5 and 6.

Methods of operating of the storage device 200 will hereinafter be described with reference to FIG. 5. In FIG. 5, the first mode may refer to an operation mode in which data is transmitted at high speed, and the second mode may refer to an operation mode in which data is transmitted at low speed. In FIG. 5, the first mode or the second mode may be selected and established by the controller 110, which is configured to decide vehicle workload, process, or operation.

For example, the first mode may refer to an operation mode in which data is processed at high speed required by the infotainment system 114 of FIG. 3, which demands a large amount of data. The second mode may refer to an operation mode in which data is processed at low speed, such as that required by the advanced driver assistance system (ADAS) 113 of FIG. 3, which uses a small amount of data.

The controller 110 of the host 100 may activate the command CMD and the address ADD needed to control operations of the storage device 200. In the embodiment illustrated in FIG. 5, the controller 110 may allow the error detection signal EDS to remain deactivated (or disabled), or it may disregard the signal.

The controller 110 may decide vehicle operation, workload, or process, and may determine whether the first mode operation for transmitting data at high speed is needed based on the decided workload. If the first mode operation is needed, the controller 110 may activate the interface control signal IFCON. The interface controller 120 may activate the interface selection signal IF1, and may thus transmit data DQ_A to the storage device 200 through the first interface 130.

Thereafter, during activation of the interface control signal ICON, the first storage interface 220 may transmit data DQ_A to the first data controller 240. The first data controller 240 may receive data DQ_A as an input, such that the first data controller 240 may output data DQA to the first core circuit 261 during activation of the data control signal DCON.

In response to the internal command ICMD and the internal address IADD, the first core circuit 261 may select a specific memory bank (for example, bank B0) to be used to store data DQA. The first core circuit 261 may be synchronized with a specific time point of the clock signal CLK, such that the first core circuit 261 may store data D0~D7 in the selected bank B0 in a high-speed operation mode. In this case, during execution of the high-speed operation mode, the first core circuit 261 may store one data set and another data set (i.e., two sets of data) in the bank B0 at intervals of one cycle of the clock signal CLK. The above-mentioned data storage operation will hereinafter be referred to as a Double Data Rate (DDR) operation.

The controller 110, which determines vehicle operation, workload, or process, and may determine whether the second mode operation for transmitting data at low speed is needed based on the decided workload. If the second mode operation is needed, then the controller 110 may activate the interface control signal IFCON. Thereafter, the interface controller 120 may activate the interface selection signal IF2, and may thus transmit data DQ_B to the storage device 200 through the second interface 140.

Thereafter, during activation of the interface control signal ICON, the second storage interface 230 may transmit data DQ_B to the second data controller 250. The second data controller 250 may receive data DQ_B as an input, such that the second data controller 250 may output data DQB to the second core circuit 262 during activation of the data control signal DCON.

In response to the internal command ICMD and the internal address IADD, the second core circuit 262 may select a specific memory bank (for example, bank B4) to be used to store data DQB. The second core circuit 262 may be synchronized with a specific time point of the clock signal CLK, such that the second core circuit 262 may store data D0~D7 in the selected bank B4 in a low-speed operation mode. In this case, during execution of the low-speed operation mode, the second core circuit 262 may store one data in the bank B4 at intervals of one cycle of the clock signal CLK. The above-mentioned data storage operation will hereinafter be referred to as a Single Data Rate (SDR) operation.

In an embodiment, methods of operating the storage device 200 will hereinafter be described with reference to FIG. 6. In FIG. 6, the first mode may refer to an operation mode in which data is normally transmitted to a destination, and the second mode may refer to an operation mode in which data is transmitted with highly-reliable operation characteristics. In FIG. 6, the first mode or the second mode may be selected and established by the controller 110 configured to decide vehicle operation, workload or process.

For example, the first mode may refer to an operation mode in which data is normally processed according to operation, workload or process of the convenience control system 115 shown in FIG. 3. The second mode may refer to an operation mode in which data is processed to have highly-reliable operation characteristics according to operation, workload or process of the vehicle driving controller 111 shown in FIG. 3, in which driving stability is considered important.

The controller 110 of the host 100 may activate the command CMD and the address ADD needed to control operations of the storage device 200. In the embodiment of FIG. 6, the controller 110 may activate the error detection signal EDS.

The controller 110 may decide vehicle operation, workload or process, and may determine whether the first mode operation for normally transmitting data is needed based on the decided operation, workload or process. If the first mode operation is needed, then the controller 110 may activate the interface control signal IFCON. Thereafter, the interface controller 120 may activate the interface selection signal IF1, and may thus transmit data DQ_A to the storage device 200 through the first interface 130.

Thereafter, during activation of the interface control signal ICON, the first storage interface 220 may transmit data DQ_A to the first data controller 240. The first data controller 240 may receive data DQ_A as an input, such that the first data controller 240 may output data DQA to the first core circuit 261 during activation of the data control signal DCON.

In response to the internal command ICMD and the internal address IADD, the first core circuit 261 may select a specific memory bank (for example, bank B0) to be used to store data DQA. The first core circuit 261 may be synchronized with a specific time point of the clock signal CLK, such that the first core circuit 261 may store data D0~D7 in the selected memory bank B0 during a normal-mode operation. In this case, during execution of the normal-mode operation, the first core circuit 261 may store one data set and another data set (i.e., two sets of data) in a selected memory bank at intervals of one cycle of the clock signal CLK.

The controller 110 may determine vehicle operation, workload or process, and may determine whether the second mode operation for transmitting data with highly-reliable operation characteristics is needed based on the decided operation, workload or process. If the second mode operation is needed, then the controller 110 may activate the interface control signal IFCON. Thereafter, the interface controller 120 may activate the interface selection signal IF2, and may thus transmit data DQ_B and error detection data EDC_B to the storage device 200 through the second interface 140.

Thereafter, during activation of the interface control signal ICON, the second storage interface 230 may transmit data DQ_B and error detection data EDC_B to the second data controller 250. The second data controller 250 may receive data DQ_B and error detection data EDC_B, such that the second data controller 250 may output data DQB and error detection data EDCB to the second core circuit 262 during activation of the data control signal DCON.

In response to the internal command ICMD and the internal address IADD, the second core circuit 262 may select a specific memory bank (for example, bank B4) to be used to store data DQB. The second core circuit 262 may be synchronized with a specific time point of the clock signal CLK, such that the second core circuit 262 may store data D0~D7 in the selected memory bank during a highly-reliable operation mode.

In this case, the error detection signal EDIS may be activated at a specific time point of the clock signal CLK. The error correction circuit 263 of the second core circuit 262 may detect occurrence or non-occurrence of at least one error in the data DQB using the error detection data EDC_B, and may then correct the detected error. The error detection data EDC_B may include an Error Correction Code (ECC) or an Error Detection Code (EDC).

In accordance with one embodiment, various error detection and correction technologies can be applied to the error correction circuit 263. For example, the error correction circuit 263 may use the error correction code (ECC) in dirty or rogue data, and may use the error detection code (EDC) in clean data.

For example, as representative examples of such ECC, SECDED, Double Error Correction, Triple Error Detection (DECTEC), Quadruple Error Correction, Pentuple Error Detection (QECPED), Octuple Error Correction, Nonuple Error Detection (OECNED), etc. may be used in the embodiments of the present disclosure. As representative examples of such EDC, a Cyclic Redundancy Code (CRC), a parity bit, or the like may be used in the embodiments of the present disclosure.

As is apparent from the above description, the smart vehicle system according to the embodiments of the present disclosure may greatly increase efficiency with respect to memory operations in a vehicle with a smart vehicle system.

Those skilled in the art will appreciate that the embodiments may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment or included as a new claim by a subsequent amendment after the application is filed.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A smart vehicle system comprising:
 a host configured to select any one of a first mode and a second mode according to a workload of a vehicle, and to transmit and receive only a first data without an error detection data through a first channel or to transmit and receive a second data and the error detection data through a separate second channel; and
 a storage device configured to store the first data received through the first channel in a first core circuit and to store the second data and the error detection data received through the second channel in a second core circuit, or to read the first data stored in the first core circuit and the second data and the error detection data stored in the second core circuit, and to transmit the first data to the host through the first channel or to transmit the second data and the error detection data to the host through the second channel,
 wherein the first core circuit and the second core circuit, included in a single memory device and divided by bank group, are configured to execute different operations in the first mode and the second mode, and
 wherein the first channel and the second channel are plural, at least two or more of the plurality of first channels and the plurality of second channels are selected to transmit and receive the first data or to transmit and receive the second data and the error detection data according to the first mode and the second mode.

2. The smart vehicle system according to claim 1, wherein the host comprises:
   a controller configured to generate a control signal for controlling operations of the storage device, and to generate an interface control signal to select the first channel or the second channel for transmitting the first data, the second data and the error detection data to the storage device in response to the first mode and the second mode;
   an interface controller configured to activate any one of a first interface selection signal and a second interface selection signal in response to the interface control signal;
   a first interface configured to transmit and receive the first data to and from the storage device through the first channel after activation of the first interface selection signal; and
   a second interface configured to transmit and receive the second data to and from the storage device through the second channel after activation of the second interface selection signal.

3. The smart vehicle system according to claim 2, wherein the control signal includes at least one of a command, an address, and an error detection signal.

4. The smart vehicle system according to claim 2, wherein the second interface is configured to transmit and receive the error detection data to and from the storage device through the second channel after activation of the second interface selection signal.

5. The smart vehicle system according to claim 2, wherein the host further comprises:
   a communication controller, configured to communicate with an external electronic device under control of the controller.

6. The smart vehicle system according to claim 2, wherein the controller is configured to decide the workload in consideration of an amount or reliability of necessary data during operation of at least one of a vehicle driving controller, an advanced driver assistance system (ADAS), an infotainment system, and a convenience control system.

7. The smart vehicle system according to claim 1, wherein the first mode and the second mode are distinguished from each other according to a requirement for data bandwidth.

8. The smart vehicle system according to claim 1, wherein the first mode and the second mode are distinguished from each other according to a requirement for data reliability.

9. The smart vehicle system according to claim 1, wherein the storage device comprises:
   a storage controller configured to generate a clock signal, an error detection signal, a command, and an address used to control operations of the memory device, and to generate an interface control signal and a data control signal;
   a first storage interface configured to transmit and receive the first data through the first channel in response to the interface control signal;
   a second storage interface configured to transmit and receive the second data through the second channel in response to the interface control signal;
   a first data controller configured to transmit and receive the first data in response to the data control signal; and
   a second data controller configured to transmit and receive the second data in response to the data control signal.

10. The smart vehicle system according to claim 9, wherein the second storage interface is configured to transmit and receive the error detection data through the second channel in response to the interface control signal, after the error detection signal is activated.

11. The smart vehicle system according to claim 9, wherein the first core circuit is configured to store or read the first data in or from at least one bank of a first bank group in response to the clock signal, the command, and the address.

12. The smart vehicle system according to claim 9, wherein the second core circuit is configured to store or read the second data in or from at least one bank of a second bank group in response to the clock signal, the command, and the address.

13. The smart vehicle system according to claim 12, wherein the second core circuit further comprises:
   an error correction circuit configured to detect and correct at least one error of the second data in response to error detection data after activation of the error detection signal.

14. The smart vehicle system according to claim 1, wherein the first core circuit is configured to transmit at a double data rate (DDR) during operation in the first mode.

15. The smart vehicle system according to claim 1, wherein the second core circuit is configured to transmit at a single data rate (SDR) during operation in the second mode.

16. The smart vehicle system according to claim 1, wherein the first core circuit and the second core circuit are included in a single chip.

17. The smart vehicle system according to claim 1, wherein the first core circuit and the second core circuit include asynchronous parameters, and are accessed at different times.

18. A smart vehicle system comprising:
   a memory device configured to include a first core circuit storing a first data received through a first channel and a second core circuit storing a second data and an error detection data received through a different second channel; and
   a storage controller configured to generate a clock signal, an error detection signal, a command, and an address used to control operations of the memory device, and to generate an interface control signal and a data control signal,
   wherein the memory device stores or reads only the first data without the error detection data in the first core circuit, and stores or reads the second data and the error detection data in the second core circuit,
   wherein the first core circuit and the second core circuit are included in a single memory device and are divided by bank group,
   wherein the first channel and the second channel are plural, at least two or more of the plurality of first channels and the plurality of second channels are selected to transmit and receive the first data or to transmit and receive the second data and the error detection data according to a first operation mode and a second operation mode, and
   wherein the first operation mode and the second operation mode are selected according to a workload of a vehicle.

19. The smart vehicle system according to claim 18, further comprising:
   a first storage interface configured to transmit and receive the first data through the first channel in response to the interface control signal;

a second storage interface configured to transmit and receive second data through the second channel in response to the interface control signal;

a first data controller configured to transmit and receive the first data in response to the data control signal; and a second data controller configured to transmit and receive the second data in response to the data control signal.

20. The smart vehicle system according to claim 19, wherein the second core circuit further comprises:

an error correction circuit configured to detect and correct at least one error of the second data in response to error detection data after activation of the error detection signal.

* * * * *